(12) United States Patent
O'Neil et al.

(10) Patent No.: US 10,724,591 B2
(45) Date of Patent: Jul. 28, 2020

(54) BRAKE ASSEMBLY WITH DISKS OF VARIABLE THICKNESS AND METHODS FOR DISK REUSE

(71) Applicant: Goodrich Corporation, Charlotte, NC (US)

(72) Inventors: Matthew R. O'Neil, Tipp City, OH (US); Gary C. Riebe, Tipp City, OH (US)

(73) Assignee: GOODRICH CORPORATION, Charlotte, NC (US)

( * ) Notice: Subject to any disclaimer, the term of this patent is extended or adjusted under 35 U.S.C. 154(b) by 0 days.

(21) Appl. No.: 15/822,353

(22) Filed: Nov. 27, 2017

(65) Prior Publication Data

US 2019/0162262 A1   May 30, 2019

(51) Int. Cl.
*F16D 65/12* (2006.01)
*F16D 55/24* (2006.01)
(Continued)

(52) U.S. Cl.
CPC ........... *F16D 65/125* (2013.01); *F16D 55/24* (2013.01); *F16D 55/40* (2013.01); *F16D 65/127* (2013.01); *F16D 2055/0058* (2013.01); *F16D 2055/0095* (2013.01); *F16D 2200/0039* (2013.01); *F16D 2200/0052* (2013.01); *F16D 2250/0084* (2013.01)

(58) Field of Classification Search
CPC ................... F16D 55/36; F16D 65/126; F16D 2200/0052; F16D 2055/0095; F16D 2250/0084; F16D 2200/0039; F16D 69/023; F16D 2200/0047; B64C 25/42; B60T 8/1703

See application file for complete search history.

(56) References Cited

U.S. PATENT DOCUMENTS 3,956,548 A * 5/1976 Kovac ..................... C04B 35/83
                                                              428/66.2
4,742,895 A   5/1988 Bok
(Continued)

FOREIGN PATENT DOCUMENTS

CA   2004091   5/1990
EP   0346066   12/1989
(Continued)

OTHER PUBLICATIONS

European Patent Office, European Search Report dated May 29, 2019 in Application No. 18208610.8.

*Primary Examiner* — Bradley T King
*Assistant Examiner* — Mahbubur Rashid
(74) *Attorney, Agent, or Firm* — Snell & Wilmer, L.L.P.

(57) ABSTRACT

A method of making a brake assembly using recycled friction disks may comprise removing a first friction disk from a worn brake assembly, removing a portion of the first friction disk to reduce a thickness of the first friction disk, and incorporating a previously unused friction disk and the first friction disk into a brake assembly comprising unworn rotor disks made of a first material. The previously unused friction disk and the first friction disk may comprise a second material different from the first material. The thickness of the first friction disk may be different from a thickness of the previously unused friction disk.

12 Claims, 6 Drawing Sheets

(51) Int. Cl.
*F16D 55/40* (2006.01)
*F16D 55/00* (2006.01)

(56) References Cited

U.S. PATENT DOCUMENTS

| | | | | |
|---|---|---|---|---|
| 4,977,985 | A * | 12/1990 | Wells | F16D 55/36 |
| | | | | 188/196 M |
| 5,295,560 | A * | 3/1994 | Moseley | F16D 55/36 |
| | | | | 188/218 XL |
| 5,551,534 | A * | 9/1996 | Smithberger | F16D 55/36 |
| | | | | 188/250 B |
| 6,340,075 | B1 | 1/2002 | Bok et al. | |
| 6,439,353 | B2 | 8/2002 | Roloff et al. | |
| 6,855,428 | B2 | 2/2005 | Lau et al. | |
| 7,104,366 | B2 * | 9/2006 | McAfee | F16D 55/36 |
| | | | | 188/71.5 |
| 7,168,528 | B1 | 1/2007 | Bok et al. | |
| 8,573,369 | B2 | 11/2013 | Scelsi et al. | |
| 9,416,831 | B2 | 8/2016 | Nixon et al. | |
| 2002/0170787 | A1 * | 11/2002 | James | C04B 35/83 |
| | | | | 188/218 XL |
| 2004/0112687 | A1 | 6/2004 | McAfee et al. | |
| 2005/0011706 | A1 * | 1/2005 | Johnson | C04B 35/563 |
| | | | | 188/71.1 |
| 2007/0175710 | A1 * | 8/2007 | Walker | F16D 65/0043 |
| | | | | 188/71.5 |
| 2014/0054810 | A1 * | 2/2014 | Cho | B29C 73/02 |
| | | | | 264/36.18 |
| 2014/0251739 | A1 * | 9/2014 | Nixon | F16D 55/36 |
| | | | | 188/218 XL |
| 2015/0001009 | A1 * | 1/2015 | Chambard | B60T 1/065 |
| | | | | 188/71.5 |
| 2015/0136547 | A1 * | 5/2015 | Chambard | B23P 6/00 |
| | | | | 188/218 XL |
| 2017/0001373 | A1 * | 1/2017 | La Forest | B28B 1/001 |
| 2017/0138423 | A1 * | 5/2017 | Kirkpatrick | B64C 25/42 |
| 2017/0175833 | A1 * | 6/2017 | Le Costaouec | D06M 23/08 |
| 2017/0267594 | A1 * | 9/2017 | Le Costaouec | F16D 69/023 |
| 2017/0321770 | A1 * | 11/2017 | Cyrot | F16D 55/46 |

FOREIGN PATENT DOCUMENTS

| | | |
|---|---|---|
| EP | 0840029 | 5/1998 |
| EP | 1052422 | 11/2000 |
| EP | 1103738 | 5/2001 |
| EP | 2647861 | 10/2013 |
| EP | 2775161 | 9/2014 |
| EP | 2818750 | 12/2014 |

* cited by examiner

BRAKE ASSEMBLY WITH DISKS OF VARIABLE THICKNESS AND METHODS FOR DISK REUSE

FIELD

The present disclosure relates to aircraft braking systems, and, more particularly, to methods for reusing friction disks in brake assemblies having friction disks of varying thickness.

BACKGROUND

Aircraft brake systems typically employ a brake stack comprised of a series of friction disks, which may be forced into contact with one another to stop the aircraft. Hybrid brake stacks may comprise ceramic matrix composite (CMC) friction disks alternating with carbon fiber-reinforced/carbon matrix (C/C) composite friction disks. Generally, when a hybrid brake stack reaches its wear limit (i.e., has worn beyond a useable limit), the C/C composite disks may account for approximately 90-95% of the total wear, while the CMC disks tend to account for only 5-10% of the total wear. In this regard, when the brake stack has worn beyond the usable limit, the C/C composite disks may be consumed, with the CMC disks exhibiting very little wear; however, both disks are generally discarded.

SUMMARY

A brake assembly in an unworn state is disclosed herein. The brake assembly may comprise a friction disk stack comprising a plurality of rotors each comprising a first material, and a plurality of stators interleaved between the rotors. The stators may comprise a second material different from the first material. A wear rate of the first material may be different from a wear rate of the second material. A thickness of a first stator of the plurality of stators may be greater than a thickness of a second stator of the plurality of stators. A pressure plate may be located at a first end of the friction disk stack. The pressure plate may comprise the second material. A thickness of the pressure plate may be less than the thickness of the second stator.

In various embodiments, an end plate comprising the second material may be located at a second end of the friction disk stack opposite the first end of the friction disk stack. A thickness of the end plate may be less than the thickness of the second stator. The thickness of the end plate may be less than the thickness of the pressure plate.

In various embodiments, the first material may comprise a carbon fiber-reinforced/carbon matrix composite material. The second material may comprise a ceramic matrix composite material.

In various embodiments, at least one stator of the plurality of stators comprises a recycled stator. In various embodiments, a thickness of a third stator of the plurality of stators is less than the thickness of the first stator and greater than the thickness of the second stator.

A method of reusing a friction disk over multiple wear cycles is also disclosed herein. The method may comprise forming a first brake assembly by locating a first stator between a first rotor of the first brake assembly and a second rotor of the first brake assembly, and locating a second stator having a thickness different from a thickness of the first stator between the second rotor of the first brake assembly and a third rotor of the first brake assembly. The first stator and the second stator may comprise a first material and the first rotor of the first brake assembly and the second rotor of the first brake assembly may comprise a second material different from the first material. The first stator may comprise a first previously unused stator. The method may further comprise removing the first stator and the second stator from the first brake assembly, and forming a second brake assembly by locating a third stator between a first rotor of the second brake assembly and a second rotor of the second brake assembly, and incorporating at least one of the first stator or the second stator into the second brake assembly. The third stator may comprise a second previously unused stator.

In various embodiments, the method may further comprise removing a first portion of at least one of the first stator or the second stator prior to forming the second brake assembly.

In various embodiments, the method may further comprise removing the at least one of the first stator or the second stator from the second brake assembly, and forming a third brake assembly by locating a fourth stator between a first rotor of the third brake assembly and a second rotor of the third brake assembly and incorporating the at least one of the first stator or the second stator into the third brake assembly. The fourth stator may comprise a third previously unused stator.

In various embodiments, incorporating the at least one of the first stator or the second stator into the third brake assembly may comprise locating the at least one of the first stator or the second stator between the second rotor of the third brake assembly and a third rotor of the third brake assembly.

In various embodiments, incorporating the at least one of the first stator or the second stator into the third brake assembly may comprise using the at least one of the first stator or the second stator as at least one of a pressure plate of the third brake assembly or an end plate of the third brake assembly.

In various embodiments, the method may further comprise removing a second portion of at least one of the first stator or the second stator after the removing the at least one of the first stator or the second stator from the second brake assembly and prior to forming the third brake assembly.

In various embodiments, the first material may comprise a ceramic matrix composite material. The second material may comprise a carbon fiber-reinforced/carbon matrix composite material.

A method of making a brake assembly using recycled friction disks is also disclosed herein. The method may comprise removing a first friction disk from a worn brake assembly. The first friction disk may comprise a first material. The worn brake assembly may comprise a second friction disk comprising a second material different from the first material. The method may further comprise removing a portion of the first friction disk to reduce a thickness of the first friction disk, and incorporating a previously unused friction disk, a third friction disk, and the first friction disk into an unworn brake assembly. The previously unused friction disk and the third friction disk may comprise the first material. The thickness of the first friction disk may be different from a thickness of the previously unused friction disk and from a thickness of the third friction disk.

In various embodiments, the first friction disk, the previously unused friction disk, and the third friction disk may comprise non-rotating components of the unworn brake assembly.

In various embodiments, the first material may comprise a ceramic matrix composite material, and the second material may comprise a carbon fiber-reinforced/carbon material composite material.

In various embodiments, incorporating the first friction disk into the unworn brake assembly may comprise using the first friction disk as at least one of a pressure plate or an end plate of the unworn brake assembly.

The forgoing features and elements may be combined in various combinations without exclusivity, unless expressly indicated herein otherwise. These features and elements as well as the operation of the disclosed embodiments will become more apparent in light of the following description and accompanying drawings.

BRIEF DESCRIPTION OF THE DRAWINGS

The subject matter of the present disclosure is particularly pointed out and distinctly claimed in the concluding portion of the specification. A more complete understanding of the present disclosures, however, may best be obtained by referring to the detailed description and claims when considered in connection with the drawing figures, wherein like numerals denote like elements.

DETAILED DESCRIPTION

The detailed description of exemplary embodiments herein makes reference to the accompanying drawings, which show exemplary embodiments by way of illustration. While these exemplary embodiments are described in sufficient detail to enable those skilled in the art to practice the disclosure, it should be understood that other embodiments may be realized and that logical changes and adaptations in design and construction may be made in accordance with this disclosure and the teachings herein without departing from the spirit and scope of the disclosure. Thus, the detailed description herein is presented for purposes of illustration only and not of limitation.

Furthermore, any reference to singular includes plural embodiments, and any reference to more than one component or step may include a singular embodiment or step. Also, any reference to attached, fixed, connected, or the like may include permanent, removable, temporary, partial, full, and/or any other possible attachment option. Additionally, any reference to without contact (or similar phrases) may also include reduced contact or minimal contact.

Throughout the present disclosure, like reference numbers denote like elements. Accordingly, elements with like element numbering may be shown in the figures, but may not necessarily be repeated herein for the sake of clarity. Cross hatching lines may be used throughout the figures to denote different parts, but not necessarily to denote the same or different materials.

As used herein, "proximate" refers to a direction inward, or generally, towards the reference component. As used herein, "distal" refers to the direction outward, or generally, away from a reference component.

Brake assemblies of the present disclosure may include brake stacks comprised of non-rotating friction disks (stator disks) splined to a non-rotating wheel axle interspersed with rotating friction disks (rotor disks) splined to the rotating wheel. In various embodiments, the brake stacks may be hybrid brake stacks including rotor disks comprised of a C/C composite material and stator disks comprised of a CMC material. In various embodiments, the stator disks may be of varying thickness. For example, the stator disk proximate the piston housing (also referred to herein as the S1 position) may be thicker than the other stator disks in an unworn state. The varying thickness of the stator disks may allow the stator disks to be reused/recycled (i.e., incorporated into a brake assembly comprised of new/unworn rotor disks). For example, at overhaul, the stator disk located at the S1 position may be machined to clean the wear surface and then incorporated into the stator two (S2) position. Similarly, the stator disk in the S2 position may be machined and then incorporated into a new stator position at overhaul. The variable thickness and reuse of the CMC disks tends to reduce the amount of discarded material at overhaul and may also reduce the cost of overhauling a hybrid brake stack, as new/overhauled hybrid brake stacks may be formed using new rotors and one new CMC stator, as opposed to using new rotors and multiple new CMC stators.

Figure 1:
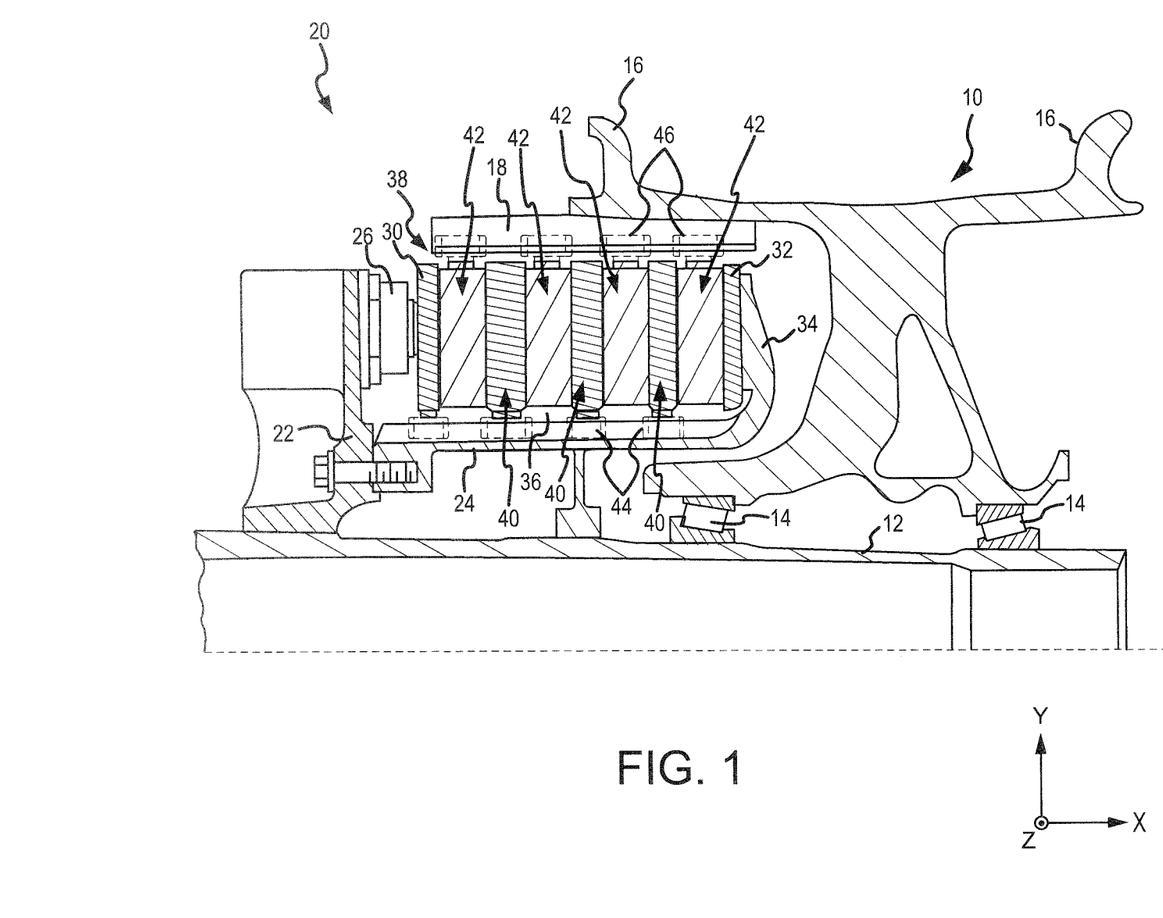
FIG. 1 illustrates a multi-disk brake assembly comprising stator disks of varying thickness, in accordance with various embodiments.

With reference to FIG. 1, a multi-disk brake assembly 20 is illustrated, in accordance with various embodiments. Brake assembly 20 may include a wheel 10 supported for rotation around axle 12 by bearings 14. Wheel 10 includes rims 16 for supporting a tire, and a series of axially extending rotor splines 18 (one shown). Rotation of wheel 10 is modulated by brake assembly 20. Brake assembly 20 includes piston housing 22, torque tube 24, a plurality of pistons 26 (one shown), pressure plate 30, and end plate 32. Torque tube 24 may be an elongated annular structure that includes a reaction plate 34 (also referred to as a back leg) and a series of axially extending stator splines 36 (one shown). Reaction plate 34 and stator splines 36 may be integral with torque tube 24, as shown in FIG. 1, or they may each be attached as separate components.

Brake assembly 20 also includes a plurality of friction disks 38. The plurality of friction disks 38 includes at least one non-rotatable friction disk (stator) 40, and at least one rotatable friction disk (rotor) 42. Each of the friction disks 38 includes an attachment structure. In various embodiments, each of the three stators 40 includes a plurality of stator lugs 44 at circumferentially spaced positions around stators 40 as an attachment structure. Similarly, each of the four rotatable rotors 42 includes a plurality of rotor lugs 46 at circumferentially spaced positions around rotor 42.

Piston housing 22 is mounted to axle 12. Torque tube 24 is bolted or otherwise coupled to piston housing 22 with reaction plate 34 of torque tube 24 proximate an axial center of wheel 10. End plate 32 is connected to, or is otherwise frictionally engaged with, a surface of reaction plate 34 that is facing axially away from the axial center of wheel 10. End plate 32 is non-rotatable by virtue of its connection to or frictional engagement with torque tube 24. Stator splines 36 may support pressure plate 30 such that pressure plate 30 is also non-rotatable. Stator splines 36 may also support non-rotatable stators 40. Stators 40 may engage stator splines 36 with gaps formed between stator lugs 44. Similarly, rotors 42 may engage rotor splines 18 with gaps formed between rotor lugs 46. Rotors 42 may be rotatable by virtue of their engagement with rotor splines 18 of wheel 10.

In various embodiments, rotors 42 are arranged with end plate 32 on one end, pressure plate 30 on the other end, and stators 40 interleaved such that rotors 42 are adjacent to non-rotatable friction components. Pistons 26 are connected to piston housing 22 at circumferentially spaced positions around piston housing 22. Pistons 26 face axially toward wheel 10 and contact a side of pressure plate 30 opposite rotors 42. Pistons 26 may be powered electrically, hydraulically, or pneumatically. In response to actuation of pistons 26, a force towards reaction plate 34 is exerted on friction disks 38 such that rotors 42 and stators 40 are pressed together between pressure plate 30 and end plate 32.

In various embodiments, the non-rotating frictional components of brake assembly 20 (i.e., pressure plate 30, end plate 32, and stators 40) may comprise a material that is different from the material of the rotating frictional component (e.g., rotors 42). For example, in various embodiments, rotors 42 comprise a C/C composite material and pressure plate 30, end plate 32, and/or stators 40 comprise CMC material. The material of the rotational components may have a wear rate that differs from the material of the non-rotational components. Stated differently, the difference in material of the rotational and non-rotational components may cause the rotational components to wear at a rate that is different from the non-rotational components. For example, the rotational components may wear faster than the non-rotational components.

Figure 2A:
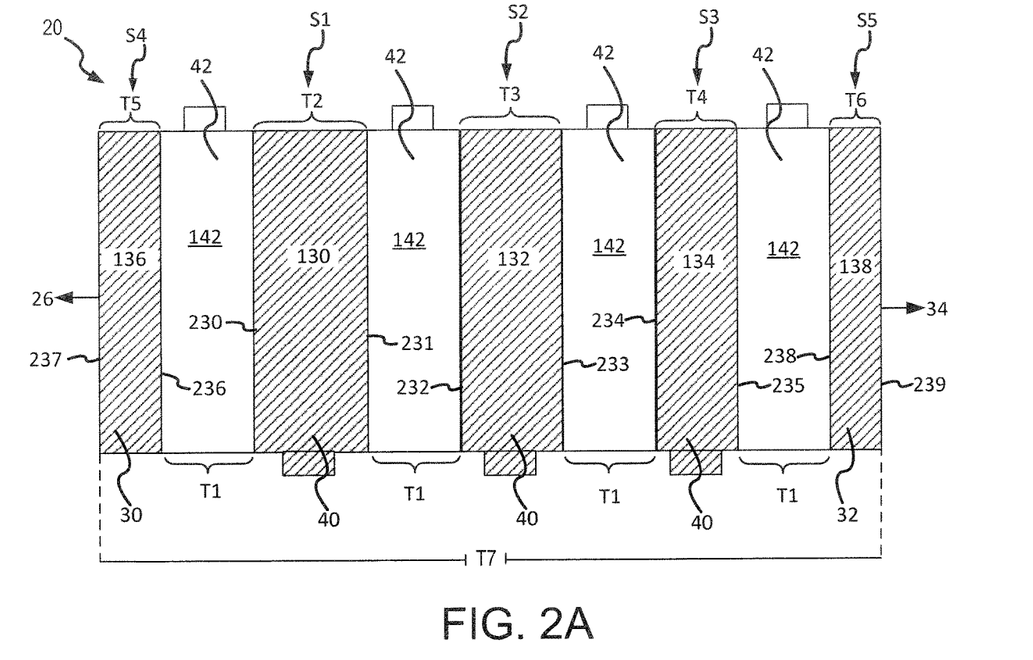
FIG. 2A illustrates a multi-disk brake assembly comprising stator disks of varying thickness in an un-worn state, in accordance with various embodiments.

FIG. 2A illustrates brake assembly 20 in an unworn state. In various embodiments, each of the rotors 42 may comprise a C/C composite disk 142. In the unworn or "new" state, as illustrated in FIG. 2A, each of the C/C composite disks 142 comprises a thickness T1. In various embodiments, in the unworn state, the C/C composite disks 142 are approximately equal in thickness. As used herein, "approximately equal" means±0.01 inches (±0.025 cm).

Figure 2B:
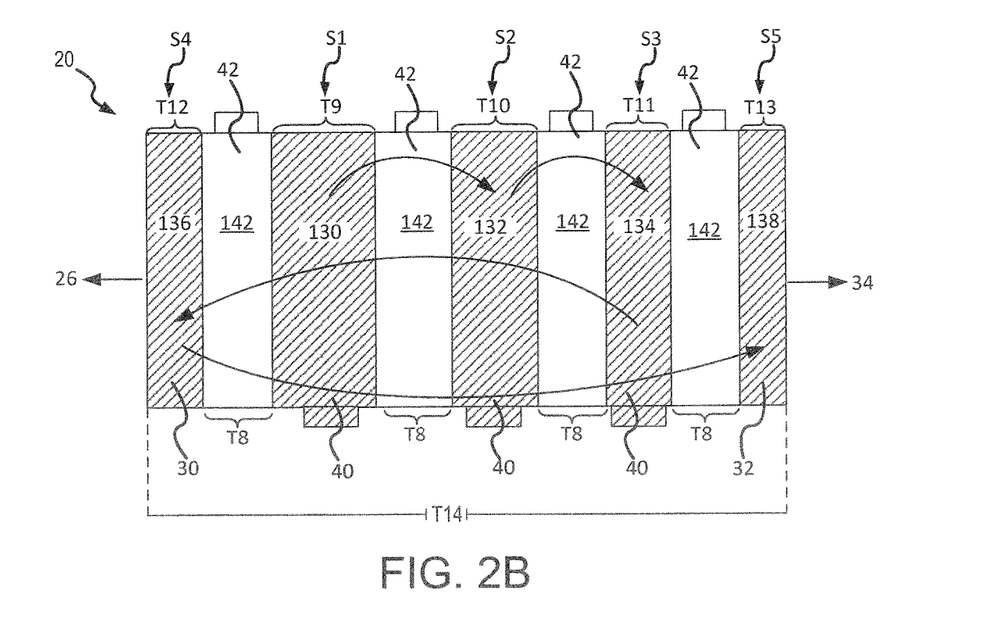
FIG. 2B illustrates a multi-disk brake assembly in a worn state, in accordance with various embodiments.

FIG. 2B illustrates brake assembly 20 after a wear cycle and in a fully worn state (i.e., worn beyond a suitable operational thickness). After a wear cycle of brake assembly 20, worn C/C composite disks 142 have a thickness T8 that is less than thickness T1.

With continued reference to FIG. 2A, the stator 40 in the first stator (S1) position of brake assembly 20 (i.e., the stator closest to pressure plate 30) may comprise a CMC disk 130. In various embodiments, CMC disk 130 may be a new or "previously unused" CMC disk. As used herein, a "previously unused" disk refers to a disk that has not been previously employed in a brake assembly and/or has not been worn by virtue of contact with a friction disk during braking. CMC disk 130 comprises opposing wear surfaces 230 and 231. During braking, wear surfaces 230 and 231 may contact C/C composite disks 142, which may create friction to decelerate the aircraft. In the unworn state of FIG. 2A, the CMC disk in the S1 position comprises a thickness T2. After a wear cycle of brake assembly 20, with momentary reference to FIG. 2B, the CMC disk in S1 position comprises a thickness T9 that is less than thickness T2.

The stator 40 in the second stator (S2) position of brake assembly 20 (i.e., the stator that is second closest to pressure plate 30) may comprise a CMC disk 132. In various embodiments, CMC disk 132 may be a recycled or previously used CMC disk. As used herein, a "recycled" or "previously used" disk refers to a disk that has been previously employed in a brake assembly and/or has been worn by virtue of contact with another friction disk. In various embodiments, the friction disk in the S2 position of brake assembly 20 may be a friction disk which was employed as an S1 friction disk during one or more previous wear cycle(s). CMC disk 132 comprises opposing wear surfaces 232 and 233. During braking, wear surfaces 232 and 233 may contact C/C composite disks 142, which may create friction to decelerate the aircraft. In the unworn state of FIG. 2A, the CMC disk in the S2 position comprises a thickness T3. In various embodiments, thickness T3 is less than thickness T2. In various embodiments, thickness T3 is between 85% and 99% of thickness T2. In various embodiments, thickness T3 is between 88% and 97% of thickness T2. In various embodiments, thickness T3 is between 90% and 95% of thickness T2. After a wear cycle of brake assembly 20, with momentary reference to FIG. 2B, the CMC disk in the S2 position has a thickness T10 that is less than thickness T3.

The stator 40 in the third stator (S3) position of brake assembly 20 (i.e., the stator that is third closest to pressure plate 30) may comprise a CMC disk 134. In various embodiments, CMC disk 134 may be a recycled or previously used CMC disk. Stated differently, the friction disk in the S3 position of brake assembly 20 may be a friction disk which was employed as an S1 and/or an S2 friction disk during one or more previous wear cycle(s). CMC disk 134 comprises opposing wear surfaces 234 and 235. During braking, wear surfaces 234 and 235 may contact C/C composite disks 142, which may create friction to decelerate the aircraft. In the unworn state of FIG. 2A, the CMC disk in the S3 position comprises a thickness T4. In various embodiments, thickness T4 is less than thickness T3. In various embodiments, T4 is between 75% and 89% of thickness T2. In various embodiments, thickness T4 is between 78% and 87% of thickness T2. In various embodiments, thickness T4 is between 80% and 85% of thickness T2. After a wear cycle of brake assembly 20, with momentary reference to FIG. 2B, the CMC disk in the S3 position has a thickness T11 that is less than thickness T4.

In various embodiments, pressure plate 30 may comprise a CMC disk 136. In this regard, pressure plate 30 may comprise a stator located in a fourth stator (S4) position of brake assembly 20. Stated differently, the S4 position may refer to a non-rotating frictional component of brake assembly 20 that comprises a non-rotating friction disk having a wear surface 236 oriented toward rotors 42, and a non-wear 237 surface oriented away from rotors 42 and toward piston 26, with momentary reference to FIG. 1. During braking, wear surface 236 may contact a C/C composite disk 142, which may create friction to decelerate the aircraft. In various embodiments, CMC disk 136 may be a recycled or previously used CMC disk. Stated differently, the friction disk in the S4 position of brake assembly 20 may be a friction disk which was employed as an S1, S2, and/or S3 friction disk during one or more previous wear cycle(s). In the unworn state of FIG. 2A, the CMC disk in the S4 position comprises a thickness T5. In various embodiments, thickness T5 is less than thickness T4. In various embodiments, thickness T5 is between 65% and 79% of thickness T2. In various embodiments, thickness T5 is between 68% and 77% of thickness T2. In various embodiments, thickness T5 is between 70% and 75% of thickness T2. After a wear cycle of brake assembly 20, with momentary reference to FIG. 2B, the CMC disk in the S4 position has a thickness T12 that is less than thickness T5.

In various embodiments, end plate 32 may comprise a CMC disk 138. In this regard, end plate 32 may comprise a stator located in a fifth stator (S5) position of brake assembly 20. Stated differently, the S5 position may be to a non-rotating frictional component of brake assembly 20 that comprises a CMC disk having a wear surface 238 oriented toward rotors 42, and a non-wear 239 surface oriented away from rotors 42 and toward reaction plate 34, with momentary reference to FIG. 1. During braking, wear surface 238 may contact a C/C composite disk 142, which may create friction to decelerate the aircraft. In various embodiments, CMC disk 138 may be a recycled or previously used CMC disk. Stated differently, the friction disk in the S5 position of brake assembly 20 may be a friction disk which was employed as an S1, S2, S3, and/or S4 friction disk during one or more previous wear cycle(s).

In the unworn state of FIG. 2A, the CMC disk in the S5 position comprises a thickness T6. In various embodiments, thickness T6 is less than thickness T5. In various embodiments, T6 may be less than thickness T4, but greater than or equal to thickness T5. In various embodiments, T6 is between 55% and 69% of thickness T2. In various embodiments, thickness T6 is between 58% and 67% of thickness T2. In various embodiments, T6 is between 60% and 65% of thickness T2. After a wear cycle of brake assembly 20, with momentary reference to FIG. 2B, the CMC disk in the S5 position comprises a thickness T13 that is less than thickness T6.

With combined reference to FIGS. 2A and 2B, in the unworn state, brake assembly 20 may have a thickness T7 extending from non-wear surface 237 of CMC disk 136 to non-wear surface 239 of CMC disk 138. After a wear cycle, fully worn brake assembly 20 may have a thickness T14 extending from non-wear surface 237 of CMC disk 136 to non-wear surface 239 of CMC disk 138. In various embodiments, a greater portion of the difference between thickness T7 and thickness T14 may be caused by reduction in the thickness (or wear) of C/C composite disks 142. For example, approximately 90% of the difference between thickness T7 and thickness 114 may be attributable to wear of C/C composite disks 142. As used herein, "approximately" means±10%. In this regard, a relatively small portion of CMC disks 130, 132, 134, 136, and 138 may be consumed during a wear cycle of brake assembly.

The wear rate of the CMC disks may allow one or more of the CMC disks to be incorporated in unworn brake assemblies. In various embodiments, when incorporating the CMC disks into unworn brake assemblies, the CMC disks may be located in new stator positions, as described in further detail below.

Figure 2C:
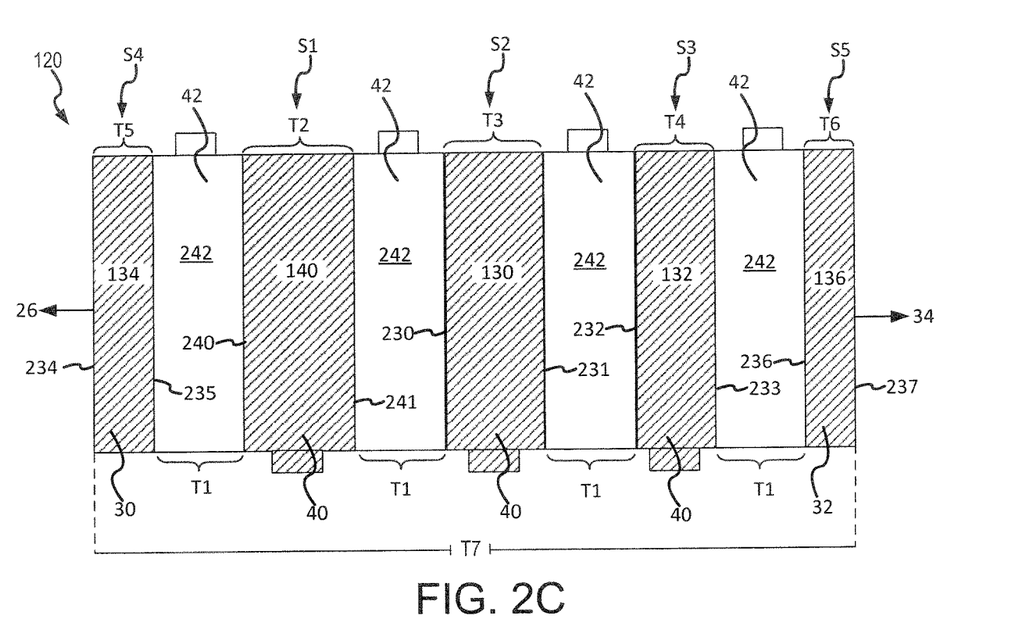
FIG. 2C illustrates an unworn multi-disk brake assembly comprising recycled stator disks of varying thickness, in accordance with various embodiments.

FIG. 2C shows an unworn brake assembly 120 incorporating recycled friction disks. In various embodiments, brake assembly 120 may include recycled CMC disks 130, 132, 134, and 136 from brake assembly 20. Brake assembly 120 may further include a previously unused CMC disk 140 in the S1 position, and a plurality of new C/C composite disks 242. A mass of unworn brake assembly 120 may be approximately equal to the mass of unworn brake assembly 20. As used herein "approximately equal" means±2% of the weight of unworn brake assembly 20. For example, and as discussed in further detail below, after completing a full wear cycle, the stator disks from worn brake assembly 20 may be translated down one position in the new brake assembly 120, and a new, previously unused disk may be introduced in the S1 position of brake assembly 120. By introducing the previously unused disk, the mass of the new, unworn brake assembly is returned to the original value (e.g., to the mass of unworn brake assembly 20).

With combined reference to FIGS. 2B and 2C, once brake assembly 20 reaches thickness T14, CMC disks 130, 132, 134, and/or 136 may be removed from brake assembly 20 and machined (e.g., cut, ground, sanded, etc.) to clean and planarize (i.e., flatten, smooth) the wear surfaces of the CMC disks. In other words, a portion of the CMC disk may be removed from one or both of the wear surfaces. In this regard, after machining the CMC disks, a thickness of CMC disk is reduced. In various embodiments, after machining, the CMC disks are incorporated into new brake assemblies. In various embodiments, a location of the CMC disks in the new brake assemblies is selected based on the thickness of the CMC disk after planarizing the wear surfaces.

In various embodiments, after a wear cycle of brake assembly 20, CMC disk 130 may be removed from brake assembly 20 and incorporated into S2 position of brake assembly 120. In various embodiments, after removing CMC disk 130 from worn brake assembly 20, wear surface 230 and 231 are planarized. Stated differently, after removal from brake assembly 20, CMC disk 130 is thinned by removing a portion of CMC disk 130 from wear surface 230 and wear surface 231. In various embodiments, at least 0.007 inches (0.018 cm) may be removed from each of wear surface 230 and wear surface 231, prior to incorporating CMC disk 130 into brake assembly 120. In various embodiments, between 0.010 inches and 0.02 inches (i.e., 0.025 cm and 0.051 cm) of material is removed from wear surface 230 and from wear surface 231. The amount of material removed from wear surfaces 230 and 231 may be determined based on the difference between thickness T9 and thickness T3. For example, the amount of material removed from wear surfaces 230 and 231 may be selected such that after removal, the thickness of CMC disk 130 equals thickness T3. In various embodiments, if after planarizing wear surfaces 230 and 231, a thickness of CMC disk 130 is less than thickness T3, additional material may be removed from surfaces wear surfaces 230 and 231 so that CMC disk 130 can be incorporated into the S3 position of brake assembly 120 (i.e., the thickness of CMC disk 130 is reduced to thickness T4). In various embodiments, CMC disk 130 may be employed in between 2 and 5 wear cycles. For example, CMC disk 130 may be located in the S1 position during a first wear cycle, in the S2 position during a second wear cycle, in the S3 position during a third wear cycle, in the S4 position during a fourth wear cycle, and in the S5 position during a fifth wear cycle.

With continued reference to FIGS. 2B and 2C, CMC disk 132 may be removed from brake assembly 20 and incorporated into the S3 position of brake assembly 120. In various embodiments, after removing CMC disk 132 from worn brake assembly 20, wear surfaces 232 and 233 are planarized. Stated differently, after removal from brake assembly 20, CMC disk 132 is thinned by removing a portion of CMC disk 132 from wear surface 232 and wear surface 233. In various embodiments, at least 0.007 inches (0.018 cm) may be removed from wear surface 232 and from wear 233, prior to incorporating CMC disk 132 into brake assembly 120. In various embodiments, between 0.010 inches and 0.02 inches (i.e., 0.025 cm and 0.051 cm) of material may be removed from wear surface 232 and from wear surface 233. The amount of material removed from wear surfaces 232 and 233 may be determined based on the difference between thickness T10 and thickness T4. For example, the amount of material removed from wear surfaces 232 and 233 may be selected such that after removal, the thickness of CMC disk 132 equals thickness T4. In various embodiments, if after planarizing wear surfaces 232 and 233, a thickness of CMC disk 132 is less than thickness T4, additional material may be removed from surfaces wear surfaces 232 and 233 so that CMC disk 132 can be incorporated into the S4 position of brake assembly 120 (i.e., the thickness of CMC disk 132 is reduced to thickness T5).

In various embodiments, CMC disk 134 may be removed from brake assembly 20 and incorporated into the S4 position of brake assembly 120. In various embodiments, after removing CMC disk 134 from worn brake assembly 20, wear surfaces 234 and 235 are planarized. In various embodiments, at least 0.007 inches (i.e., 0.018 cm) may be removed from each of wear surface 234 and wear surface 235. In various embodiments, between 0.010 inches and 0.02 inches (i.e., 0.025 cm and 0.051 cm) of material is removed from wear surface 234 and from wear surface 235. The amount of material removed from wear surfaces 234 and 235 may be determined based on the difference between thickness T11 and thickness T5. In various embodiments, if after planarizing wear surfaces 234 and 235, a thickness of CMC disk 134 is less than thickness T5, additional material may be removed from surfaces wear surfaces 234 and 235 so that CMC disk 134 can be incorporated into the S5 position of brake assembly 120 (i.e., the thickness of CMC disk 134 is reduced to thickness T6).

In various embodiments, CMC disk 136 may be removed from brake assembly 20 and incorporated into stator position S5 of brake assembly 120. In various embodiments, after removing CMC disk 136 from worn brake assembly 20, wear surface 236 and/or surface 237 is/are planarized. In various embodiments, at least 0.007 inches (i.e., 0.018 cm) may be removed from one or both surface 236 and/or surface 237. In various embodiments, only one surface may be planarized as pressure plate 30 and end plate 32 each comprise one wear surface and one non-wear surface. In various embodiments, between 0.010 inches and 0.02 inches (i.e., 0.025 cm and 0.051 cm) of material may be removed from surface 236 and/or from surface 237. The amount of material removed from surface 236 and/or surface 237 may be determined based on the difference between thickness T12 and thickness T6.

Figure 2D:
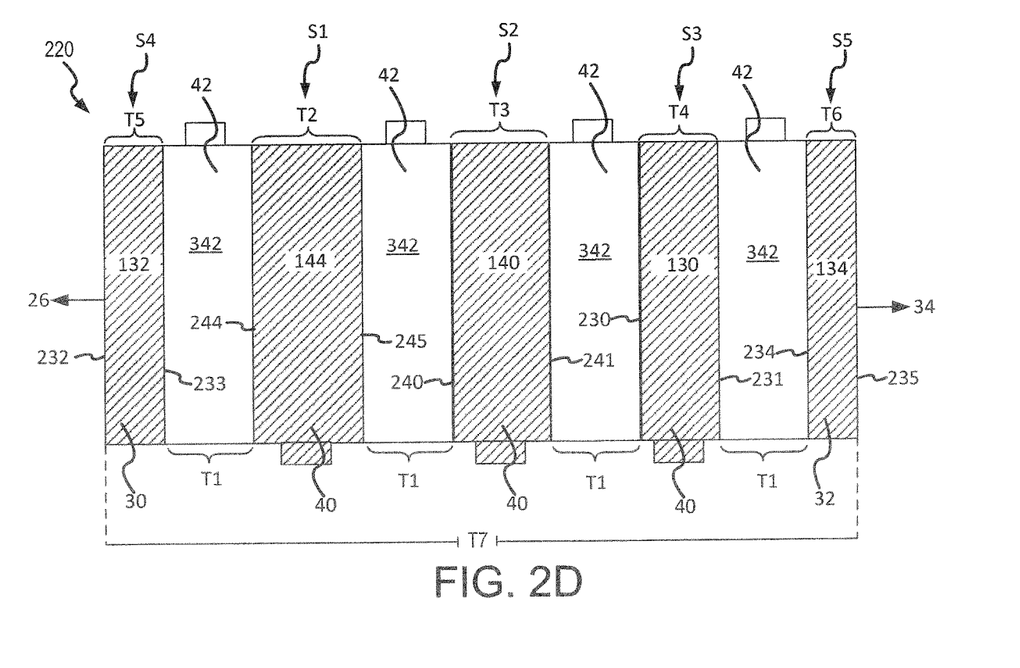
FIG. 2D illustrates an unworn multi-disk brake assembly comprising recycled stator disks of varying thickness, in accordance with various embodiments.

FIG. 2D shows a brake assembly 220 incorporating recycled friction disks. In various embodiments, brake assembly 220 may include recycled CMC disks 130, 132, 134, and 140. Brake assembly 220 may further include a previously unused CMC disk 144 in the S1 position, and a plurality of new C/C composite disks 342. A mass of unworn brake assembly 220 may be approximately equal to the mass of unworn brake assemblies 20 and 120. As used herein "approximately equal" means±2% of the weight of unworn brake assembly 20. For example, after completing a full wear cycle, each stator disks from worn brake assembly 120 may be translated down one position in the new brake stack 220, and a new, previously unused disk may be introduced in the S1 position. By introducing the new disk, previously unused the mass of the new unworn brake assembly is returned to the original value (e.g., the mass of unworn brake assembly 20).

With combined reference to FIGS. 2C and 2D, after a wear cycle of brake assembly 120, CMC disk 140 may be removed from brake assembly 120 and incorporated into the S2 position of brake assembly 220. In various embodiments, after removing CMC disk 140 from worn brake assembly 120, wear surface 240 and 241 are planarized. In various embodiments, at least 0.007 inches (0.018 cm) may be removed from wear surface 240 and from wear surface 241, prior to incorporating CMC disk into brake assembly 220. In various embodiments, between 0.010 inches and 0.02 inches (i.e., 0.025 cm and 0.051 cm) of material is removed from wear surface 240 and from wear surface 241. The amount of material removed from wear surfaces 240 and 241 is selected such that after removal, the thickness of CMC disk 140 equals thickness T3. In various embodiments, if after planarizing wear surfaces 240 and 241, a thickness of CMC disk 140 is less than thickness T3, additional material may be removed from surfaces wear surfaces 240 and 241 so that CMC disk 140 can be incorporated into the S3 position of brake assembly 220 (i.e., the thickness of CMC disk 140 is reduced to thickness T4).

In various embodiments, CMC disk 130 may be removed from brake assembly 120 and incorporated into the S3 position of brake assembly 220. In various embodiments, after removing CMC disk 130 from worn brake assembly 120, wear surfaces 230 and 231 are planarized. In various embodiments, at least 0.007 inches (0.018 cm) may be removed from wear surface 230 and from wear surface 231, prior to incorporating CMC disk 130 into brake assembly 220. In various embodiments, between 0.010 inches and 0.02 inches (i.e., 0.025 cm and 0.051 cm) of material is removed from wear surface 230 and from wear surface 231. The amount of material removed from wear surfaces 230 and 231 is selected such that after removal, the thickness of CMC disk 130 equals thickness T4. In various embodiments, if after planarizing wear surfaces 230 and 231, a thickness of CMC disk 130 is less than thickness T4, additional material may be removed from wear surfaces 230 and 231 so that CMC disk 130 can be incorporated into the S4 or S5 position of brake assembly 220 (i.e., the thickness of CMC disk 130 is reduced to thickness T5 or T6, respectively).

In various embodiments, CMC disk 132 may be removed from brake assembly 120 and incorporated into stator position S4 of brake assembly 220. In various embodiments, after removing CMC disk 132 from worn brake assembly 120, wear surfaces 232 and 233 are planarized. In various embodiments, at least 0.007 inches (i.e., 0.018 cm) may be removed from wear surfaces 232 and 233, prior to incorporating CMC disk 132 into brake assembly 220. In various embodiments, between 0.010 inches and 0.02 inches (i.e., 0.025 cm and 0.051 cm) of material is removed from wear surface 232 and from wear surface 233. The amount of material removed from wear surface 232 and wear surface 233 is selected such that after removal, the thickness of CMC disk 132 equals thickness T5. In various embodiments, if after planarizing wear surfaces 232 and 233, a thickness of CMC disk 132 is less than thickness T5, additional material may be removed from surfaces wear surfaces 232 and 233 so that CMC disk 132 can be incorporated into the S5 position of brake assembly 120 (i.e., the thickness of CMC disk 132 is reduced to thickness T6).

In various embodiments, CMC disk 134 may be removed from brake assembly 120 and incorporated into stator position S5 of brake assembly 220. In various embodiments, after removing CMC disk 134 from worn brake assembly 120, wear surface 234 and/or surface 235 is/are planarized. In various embodiments, at least 0.007 inches (i.e., 0.018 cm) may be removed from one or both surface(s) 234 and 235. In various embodiments, only one surface may be planarized as pressure plate 30 and end plate 32 each comprise one wear surface and one non-wear surface. In various embodiments, between 0.010 inches and 0.02 inches (i.e., 0.025 cm and 0.051 cm) of material may be removed from surface 234 and/or from surface 235. The amount of material removed from surface 234 and/or surface 235 is selected such that CMC disk 134 can be incorporated into the S5 position of brake assembly 120 (i.e., the thickness of CMC disk 134 is reduced to thickness T6). The CMC disks may continue to be recycled until they are worn beyond a viable thickness. For example, in various embodiments, a CMC disk comprising a thickness of less than or equal to 45% of thickness T2 (i.e., 45% of the thickness of a previously unused CMC disk) may discarded. In various embodiments, a CMC disk comprising a thickness of less than or equal to 50% of thickness T2 may discarded.

Figure 3A:
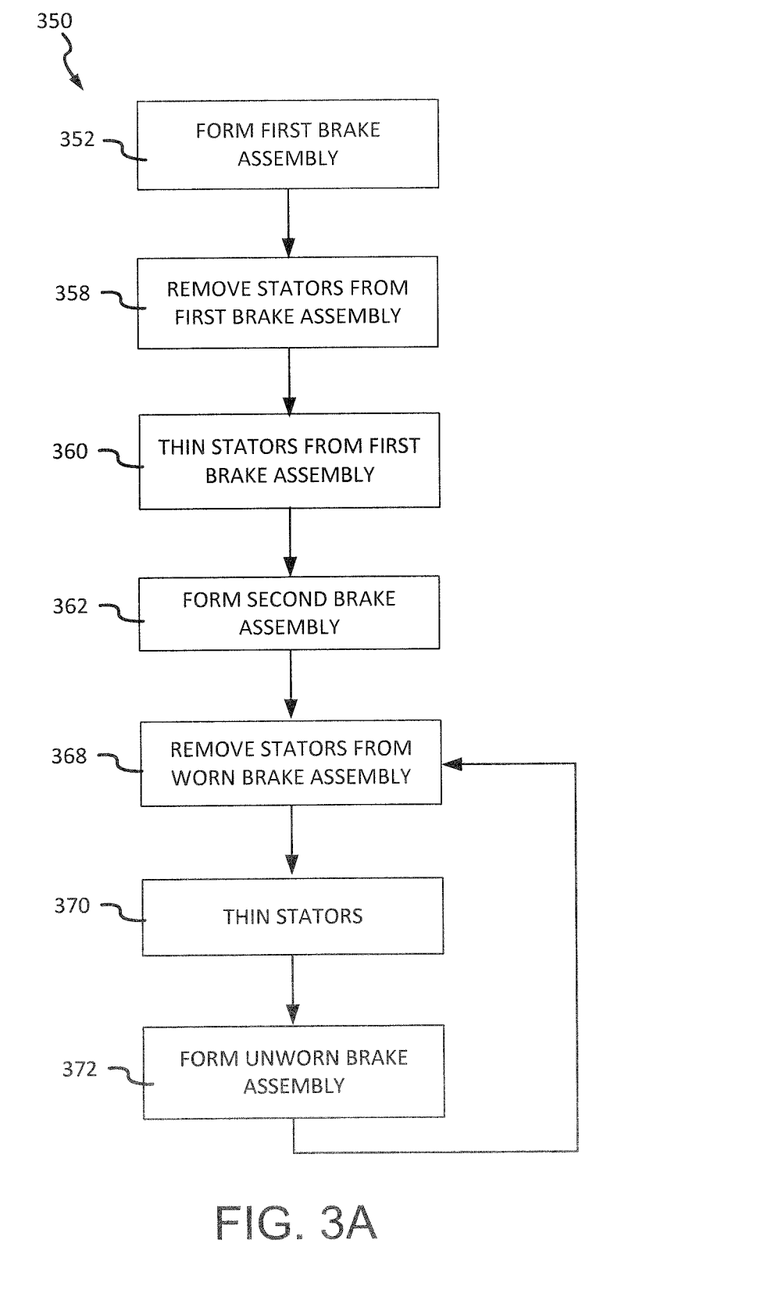
FIGS. 3A and 3B illustrate a method of reusing a friction disk over multiple brake assembly wear cycles.
Figure 3B:
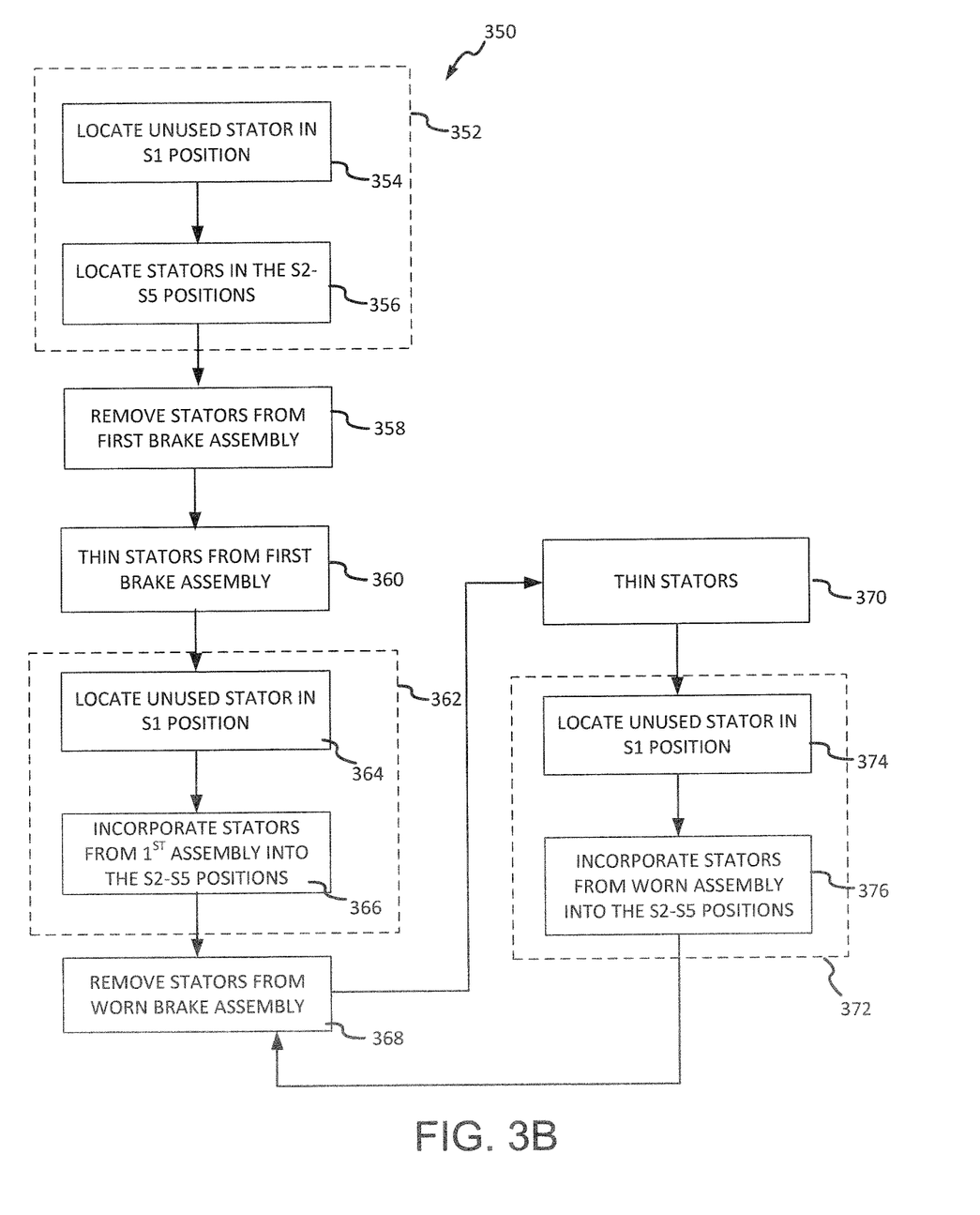

FIGS. 3A and 3B illustrate a method 350 of reusing a friction disk over multiple brake assembly wear cycles, in accordance with various embodiments. Method 350 may comprise forming a first brake assembly (step 352). Step 352 may comprise locating a previously unused stator in the S1 position (step 354), and locating stators of decreasing thickness in the S2, S3, S4, and S5 positions (step 356). In various embodiments, the stators may comprise a first material (e.g., a CMC material) and the rotors of the brake assembly may comprise a second material (e.g., a C/C composite material).

Method 350 may further comprise removing the stators from the first brake assembly (step 358) after a wear cycle of the first brake assembly, removing a portion (i.e., thinning) the stators (step 360), and forming a second brake assembly (step 362). Step 362 may include locating a previously unused stator in the S1 position of the second brake assembly (step 364), and incorporating one or more of the stators from the first brake assembly into the S2, S3, S4 and/or S5 positions of the second brake assembly (step 366).

In various embodiments, method 350 may further comprise removing the stators from second brake assembly (step 368) after a wear cycle of the second brake assembly, removing a portion (i.e., thinning) the stators (step 370), and forming a new unworn (i.e., third) brake assembly (step 372). Step 372 may include locating a previously unused stator in the S1 position of the new unworn brake assembly (step 374), and incorporating stators from a worn brake assembly (e.g., the second brake assembly) in the S2, S3, S4 and/or S5 positions of the new unworn brake assembly (step 376). In various embodiments, steps 368, 370, and 372 may be repeated as many times as desired.

Figure 4:
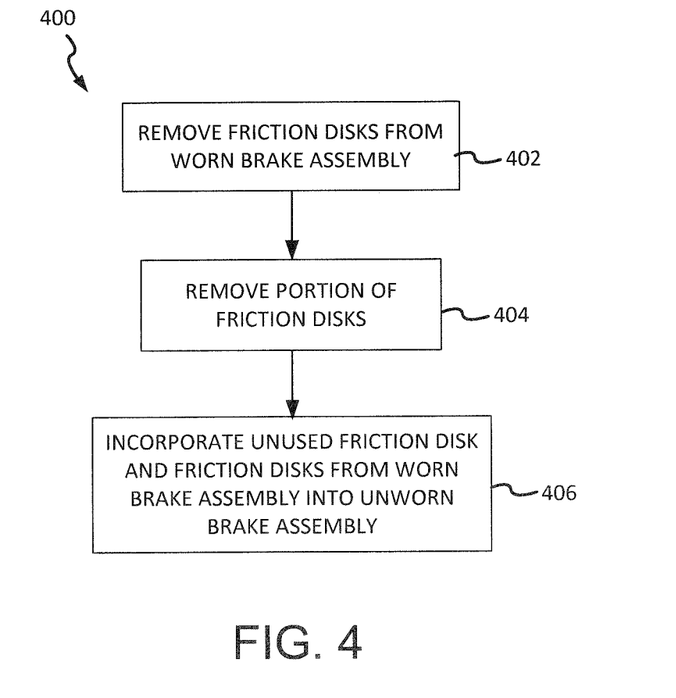
FIG. 4 illustrates a method of making a brake assembly using recycled friction disks, in accordance with various embodiments.

FIG. 4 illustrates a method 400 of making a brake assembly using recycled friction disks. Method 400 may comprise removing a first friction disk from a worn brake assembly (step 402). The first friction disk may comprise a first material. The worn brake assembly may comprise a second friction disk comprising a second material different from the first material. Method 400 may further comprise removing a portion of the first friction disk to reduce a thickness of the first friction disk (step 404), and incorporating the first friction disk and a previously unused friction disk into an unworn brake assembly (step 406). In various embodiments, step 406 may comprise using the first friction disk a pressure plate or an end plate of the unworn brake assembly.

In various embodiments, the previously unused friction disk and the third friction disk may comprise the first material. The thickness of the first friction disk may be different from a thickness of the previously unused friction disk and from a thickness of the third friction disk. In various embodiments, the first friction disk, the previously unused friction disk, and the third friction disk may comprise non-rotating components of the unworn brake assembly. In various embodiments, the first material may comprise a ceramic matrix composite material, and the second material may comprise a carbon fiber-reinforced/carbon material composite material.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosures. The scope of the disclosures is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

Systems, methods and apparatus are provided herein. In the detailed description herein, references to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f) unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A method of reusing a friction disk over multiple brake assembly wear cycles, comprising:
   forming a first brake assembly by:
   locating a first stator between a first rotor of the first brake assembly and a second rotor of the first brake assembly, the first stator comprising a first material, wherein the first rotor of the first brake assembly and the second rotor of the first brake assembly comprise a second material different from the first material, and wherein the first stator comprises a first previously unused stator, and locating a second stator having a thickness different from a thickness of the first stator between the second rotor of the first brake assembly and a third rotor of the first brake assembly, the second stator comprising the first material;

removing the first stator and the second stator from the first brake assembly, after a wear cycle of the first brake assembly; and forming a second brake assembly after the wear cycle of the first brake assembly, wherein forming the second brake assembly comprises:

locating a third stator between a first rotor of the second brake assembly and a second rotor of the second brake assembly, wherein the third stator comprises a second previously unused stator, and incorporating at least one of the first stator or the second stator from the first brake assembly into a pressure plate of the second brake assembly.

2. The method of claim 1, further comprising removing a first portion of at least one of the first stator or the second stator prior to forming the second brake assembly.

3. The method of claim 2, further comprising:

removing the at least one of the first stator or the second stator from the second brake assembly after a wear cycle of the second brake assembly; and forming a third brake assembly by:

locating a fourth stator between a first rotor of the third brake assembly and a second rotor of the third brake assembly, wherein the fourth stator comprises a third previously unused stator, and incorporating the third stator into the third brake assembly.

4. The method of claim 3, wherein the incorporating the third stator into the third brake assembly comprises locating the third stator between the second rotor of the third brake assembly and a third rotor of the third brake assembly.

5. The method of claim 3, wherein the incorporating the third stator into the third brake assembly comprises using the third stator as at least one of a pressure plate of the third brake assembly or an end plate of the third brake assembly.

6. The method of claim 3, further comprising:

removing the at least one of the first stator or the second stator from the second brake assembly after the wear cycle of the second brake assembly;

removing a second portion at least one of the first stator or the second stator after the removing the at least one of the first stator or the second stator from the second brake assembly; and incorporating the at least one of the first stator or the second stator from the second brake assembly into the third brake assembly.

7. The method of claim 1, wherein the first material comprises a ceramic matrix composite material.

8. The method of claim 7, wherein the second material comprises a carbon fiber-reinforced/carbon matrix composite material.

9. A method of making a brake assembly using recycled friction disks, comprising removing a first friction disk comprising a first material from a worn brake assembly, the worn brake assembly comprising a second friction disk, wherein the second friction disk comprises a second material different from the first material;

removing a portion of the first friction disk to reduce a thickness of the first friction disk; and incorporating a previously unused friction disk, a third friction disk, and the first friction disk from the worn brake assembly into an unworn brake assembly, wherein the previously unused friction disk and the third friction disk comprise the first material, and wherein the thickness of the first friction disk is different from a thickness of the previously unused friction disk and from a thickness of the third friction disk, wherein the incorporating the first friction disk from the worn brake assembly into the unworn brake assembly comprises using the first friction disk as at least one of a pressure plate or an end plate of the unworn brake assembly.

10. The method of claim 9, wherein the first friction disk, the previously unused friction disk, and the third friction disk comprise non-rotating components of unworn brake assembly.

11. The method of claim 10, wherein the first material comprises a ceramic matrix composite material, and wherein the second material comprises a carbon fiber-reinforced/carbon material composite material.

12. The method of claim 9, wherein the incorporating the previously unused friction disk, the third friction disk, and the first friction disk from the worn brake assembly into the unworn brake assembly comprises interleaving a plurality of rotors of approximately equal thickness between the previously unused friction disk, the third friction disk, and the first friction disk from the worn brake assembly between.

* * * * *